H. M. KELLER.
Harrow.
No. 214,667. Patented April 22, 1879.
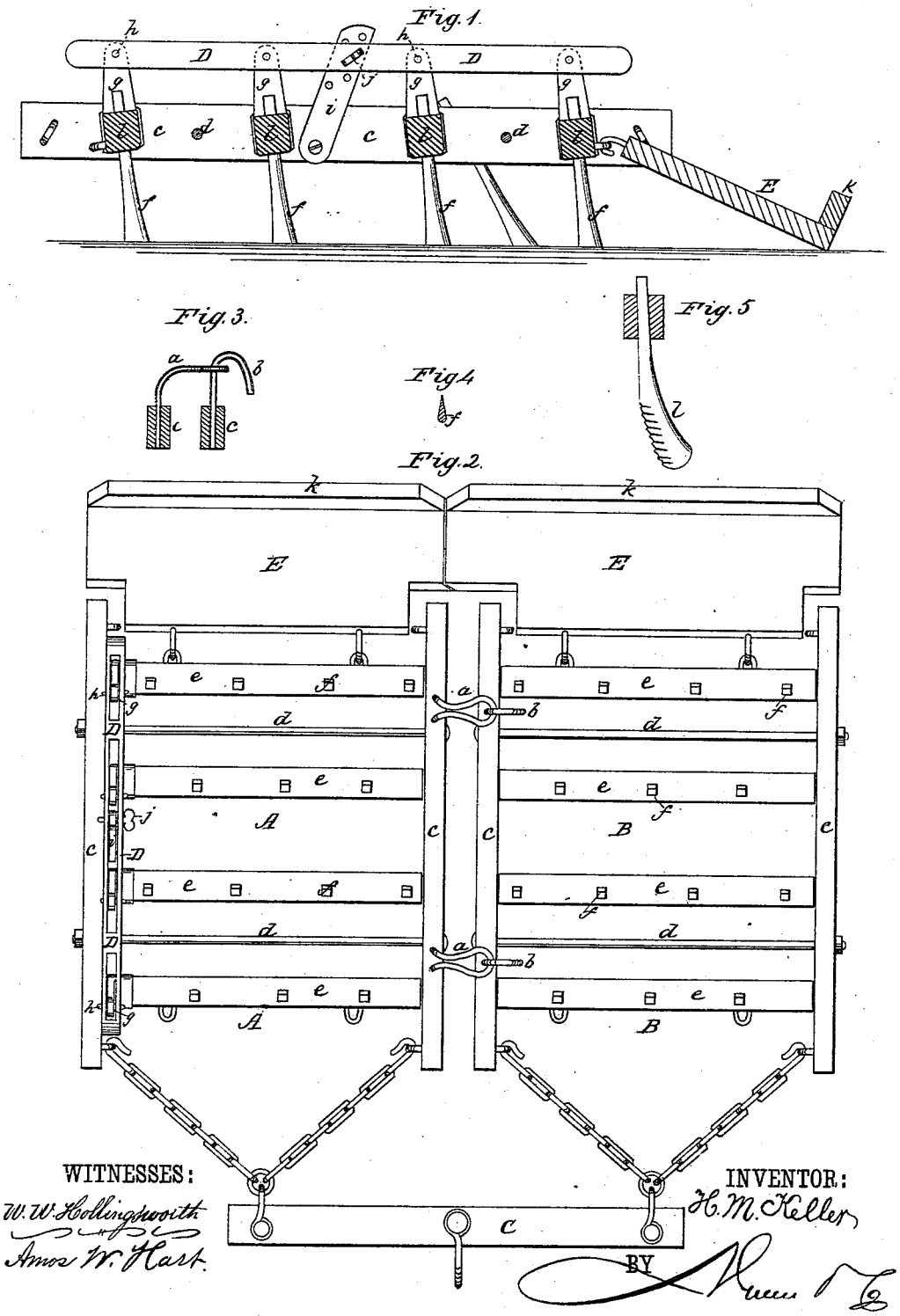

UNITED STATES PATENT OFFICE.

HENRY M. KELLER, OF NEWARK, OHIO.

IMPROVEMENT IN HARROWS.

Specification forming part of Letters Patent No. 214,667, dated April 22, 1879; application filed December 17, 1878.

*To all whom it may concern:*

Be it known that I, HENRY MILLER KELLER, of Newark, in the county of Licking and State of Ohio, have invented a new and useful Improvement in Harrows; and I do hereby declare that the following is a full, clear, and exact description of the same.

My invention is an improvement in the class of flexible harrows, or harrows which are composed of two or more parts jointed together.

The improvement consists in the construction and arrangement of parts, as hereinafter described and claimed.

In the accompanying drawings, forming part of this specification, Figure 1 is a longitudinal section of my harrow; Fig. 2, a vertical cross-section of the same. Fig. 3 is a detail view of the hinge, and Fig. 4 is a cross-section of one of the harrow-teeth. Fig. 5 represents a form of tooth or cutter which I sometimes employ.

The harrow is composed of two rectangular parts, A B, which are connected by a hinge formed of an eye, $a$, and hook $b$. The draft-bar C is attached to the ends of the two parts A B, so that as the harrow is drawn over the field its side bars, $c$, are parallel to the line of draft. The said side bars, $c$, are held in a fixed relation of parallelism by transverse rods $d$ and oscillatory toothed bars $e$, journaled therein—that is to say, the rods $d$ tend to draw the bars $c$ together, and the bars $e$ hold them apart.

Each bar $e$ has a number of teeth, $f$, which are beveled or sharp-edged on the front side, broad or blunt on the rear edge, and of gradually-increasing width from the shank downward. These teeth act very effectively in severing the sod and dividing clods of earth, and at the same time offer less resistance to the draft than the old form of prismatic teeth.

The angle of the teeth to the frame of the harrow is changeable, by reason of the bars $e$ being journaled, and thus made adjustable around their axes. Said bars are provided with arms $g$, which are pivoted by wooden pins $h$ to a slotted gage-bar, D. The latter is, in turn, secured adjustably to a rigid perforated arm, $i$, of the harrow-frame by a wooden pin, $j$.

By drawing the bar D forward or backward the journaled bars $e$ are turned so as to cause their teeth to incline rearward or forward correspondingly, and the said several parts may be locked in position by the pin $j$.

In case the teeth meet with an unyielding obstruction, one or more of the wooden pins will break, and thus allow the harrow to pass easily and safely over the obstruction.

The teeth are set in diagonal rows, as shown in Fig. 1, so that one will not follow in track of the other.

The breadth of the teeth serves to prevent a tendency of the harrow to deviate from a straight line of draft when harrowing upon a hill-side.

Following in rear of, and hinged to each part of, the harrow is a clod-breaker, E, which consists of a board or frame having a rib, $k$, along its lower side, to hold stone or other weight in place on the same. The lower edge of the board E drags on the ground, and breaks up or crushes the lumps and clods of earth, and smooths and levels the surface of the field. The latter is thus left by the harrow in a condition similar to that in which it can be put by use of the old form of harrow and roller combined; yet the draft of my improved implement is much less, and the desired result is more quickly attained.

The elongation and form of the eye and hook $a\ b$ render the hinge-connection a very loose or flexible one, and also enable one part of the harrow to be readily detached from the other.

The clod-breakers are made detachable by hook-and-staple connection with the harrow, and by interchanging them with the draft attachment, which is similarly attached, the harrow can be drawn backward for the purpose of leveling corn-ridges, which is accomplished by the broad backs of the teeth pushing the soil before them.

I do not claim, broadly, the combination of a hinged clod-crusher with a harrow; and I disclaim the employment of toothed bars or rollers which are journaled and adapted for adjustment around their axis for the purpose of changing the angle of the teeth to the ground-surface.

What I claim is—

The combination, with the harrows A B, having staples or rings at each end, and provided with teeth $f$, which are made blunt on one edge and sharp on the other, and the clod-breakers E, provided with open hooks for connecting with the said staples, whereby said clod-breakers are adapted to be detached from one end and attached at the other end of the harrows, as and for the purpose specified.

HENRY MILLER KELLER.

Witnesses:
　JAS. F. LINGAFELTER,
　JOSEPH RENZ.